(12) United States Patent
Young et al.

(10) Patent No.: US 9,546,589 B2
(45) Date of Patent: Jan. 17, 2017

(54) INTEGRATED COOLING SYSTEM AND METHOD FOR ENGINE-POWERED UNIT

(71) Applicant: General Electric Company, Schenectady, NY (US)

(72) Inventors: Henry Todd Young, Erie, PA (US); Jason Daniel Kuttenkuler, Lawrence Park, PA (US); Sean Cillessen, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 13/668,350

(22) Filed: Nov. 5, 2012

(65) Prior Publication Data

US 2014/0124170 A1    May 8, 2014

(51) Int. Cl.
| | | |
|---|---|---|
| *F01P 9/00* | (2006.01) | |
| *F02B 29/04* | (2006.01) | |
| *F01P 3/20* | (2006.01) | |
| *F01P 7/16* | (2006.01) | |
| *F02D 29/06* | (2006.01) | |

(52) U.S. Cl.
CPC .............. *F02B 29/0443* (2013.01); *F01P 3/20* (2013.01); *F01P 7/165* (2013.01); *F01P 2050/30* (2013.01); *F02D 29/06* (2013.01); *Y02T 10/146* (2013.01)

(58) Field of Classification Search
CPC ... F01P 7/165; F01P 2050/24; F01P 2005/105; F02B 29/0412
USPC ................. 123/41.01, 41.29, 41.31
See application file for complete search history.

(56) References Cited

U.S. PATENT DOCUMENTS

| | | | | |
|---|---|---|---|---|
| 5,201,285 | A * | 4/1993 | McTaggart ................ | F01P 3/20 123/41.29 |
| 5,255,733 | A * | 10/1993 | King ..................... | B60H 1/004 123/142.5 R |
| 5,353,757 | A * | 10/1994 | Susa et al. ................. | 123/41.29 |
| 5,415,147 | A * | 5/1995 | Nagle et al. ................. | 123/563 |
| 5,834,132 | A * | 11/1998 | Hasegawa et al. ............ | 429/62 |
| 6,053,132 | A * | 4/2000 | Evans .......................... | 123/41.5 |
| 6,323,613 | B1 * | 11/2001 | Hara ........................ | B60K 6/26 165/299 |
| 6,450,275 | B1 * | 9/2002 | Gabriel .................... | B60K 6/22 165/41 |
| 6,705,101 | B2 * | 3/2004 | Brotz ....................... | B60H 1/00 62/198 |
| 7,147,071 | B2 * | 12/2006 | Gering ............... | B60H 1/00278 165/164 |
| 7,322,399 | B2 * | 1/2008 | Guerrero et al. ............. | 165/101 |
| 7,334,422 | B2 | 2/2008 | Zywiak et al. | |
| 7,649,273 | B2 * | 1/2010 | Zillmer .................. | B60K 6/485 123/41.31 |

(Continued)

*Primary Examiner* — Marguerite McMahon
*Assistant Examiner* — James Kim
(74) *Attorney, Agent, or Firm* — John A. Kramer; Global Patent Operation

(57) ABSTRACT

The present invention relates to an integrated cooling system for a vehicle. The system includes an engine cooling loop having a first fluid configured for circulation through an engine of the vehicle and a power electronics cooling loop having a second fluid configured for circulation through at least one power electronics component of the vehicle. The engine cooling loop is fluidly isolated from, and in thermal communication with, the power electronics cooling loop.

14 Claims, 2 Drawing Sheets

(56) References Cited

U.S. PATENT DOCUMENTS

| | | | |
|---|---|---|---|
| 7,660,660 B2* | 2/2010 | Butts | F01P 7/167 |
| | | | 123/41.02 |
| 7,735,461 B2* | 6/2010 | Vetrovec | 123/41.14 |
| 8,430,069 B2* | 4/2013 | Min | B60H 1/00328 |
| | | | 123/41.29 |
| 2006/0053814 A1* | 3/2006 | Naik et al. | 62/241 |
| 2008/0251303 A1* | 10/2008 | Rouaud | B60K 6/26 |
| | | | 180/65.27 |
| 2010/0087979 A1 | 4/2010 | Neusinger | |
| 2011/0100619 A1* | 5/2011 | De Andrade Filho | F16K 31/402 |
| | | | 165/287 |

* cited by examiner

INTEGRATED COOLING SYSTEM AND METHOD FOR ENGINE-POWERED UNIT

FIELD OF THE INVENTION

Embodiments of the invention relate generally to cooling systems. Other embodiments relate to cooling systems for internal combustion engines and power electronics.

BACKGROUND OF THE INVENTION

Most modern rail locomotives are of the diesel-electric variety, in which an internal combustion engine, most often a diesel engine, drives an electrical generator whose output provides power to traction motors to turn the wheels of the locomotive to generate motion. The diesel engine, which is typically a turbocharged diesel engine, requires a cooling system to limit the temperatures of various engine components. Accordingly, internal combustion engines are known to be designed with internal cooling passages for the circulation of coolant to remove heat energy from the engine components and from lubricating oil which is also circulated throughout the engine to reduce friction.

Similarly, other off-highway vehicles ("OHVs"), such as those used in the mining industry, may employ electrically motorized wheels for propelling or retarding the vehicle. For example, mining dump trucks typically include a large horsepower diesel engine (or other engine) in conjunction with an alternator, a main traction inverter, and a pair of wheel drive assemblies housed within the rear tires of the vehicle. The diesel engine is directly associated with the alternator such that the diesel engine drives the alternator. The alternator powers the main traction inverter, in which semiconductor power switches commutate the alternator output current to provide electrical power to electric drive motors of the two wheel drive assemblies.

Accordingly, rail vehicles and other OHVs may contain power electronics which are utilized to control and manage the conversion of mechanical energy into electrical energy and to control the supply of electrical power to the traction motors of the locomotive, other rail vehicle, or other OHV. These power electronics also require cooling systems to maximize lifespan and to ensure proper operation thereof.

Existing locomotives and other OHVs are, therefore, typically outfitted with an engine cooling system having an engine-dedicated liquid-to-air heat exchanger, e.g., a main radiator having an associated cooling fan, and a pump for circulating a cooling fluid through the engine and the main radiator. In addition, a separate cooling system is utilized for the power electronics. This separate cooling system includes a power electronics-dedicated liquid-to-air heat exchanger, e.g., a radiator having an associated cooling fan, and a pump for circulating a cooling fluid through the power electronics and the radiator.

As will be readily appreciated, however, having two separate cooling loops, each with a dedicated radiator and cooling fan, adds significant weight, volume and cost to the cooling system, as a whole.

BRIEF DESCRIPTION OF THE INVENTION

An embodiment of the present invention relates to an integrated cooling system for an engine-powered unit. The system includes an engine cooling loop having a first fluid configured for circulation through an engine of the engine-powered unit and a power electronics cooling loop having a second fluid configured for circulation through at least one power electronics component of the engine-powered unit. The engine cooling loop is fluidly isolated from, and in thermal communication with, the power electronics cooling loop. Engine-powered unit refers to a locomotive, other rail vehicle, other OHV, other vehicle, or other system (such as a generator system) having an engine that provides motive power, power for generating electricity, and/or the like.

In another embodiment, a method for cooling an engine and power electronics of an engine-powered unit is provided. The method includes the steps of circulating a first fluid through an engine cooling loop to remove heat from the engine, circulating a second fluid through a power electronics cooling loop to remove heat from the power electronics, and cooling the second fluid by transferring heat from the second fluid to the first fluid.

In another embodiment, a cooling system is provided. The cooling system includes a first loop having a first fluid configured for circulation through a first component, a second loop having a second fluid configured for circulation through a second component, and a heat exchanger configured to transfer heat from one of the first fluid and the second fluid to the other of the first fluid and the second fluid. The first fluid and the second fluid are fluidly isolated from one another.

In yet another embodiment, a cooling system is provided. The cooling system includes an engine having a plurality of first cooling passages, at least one power electronics component having a plurality of second cooling passages, a heat exchanger in fluid communication with the engine and the at least one power electronics component, and a pump configured to circulate a cooling fluid through the engine, the at least one power electronics component and the heat exchanger to remove heat from the engine and the at least one power electronics component.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
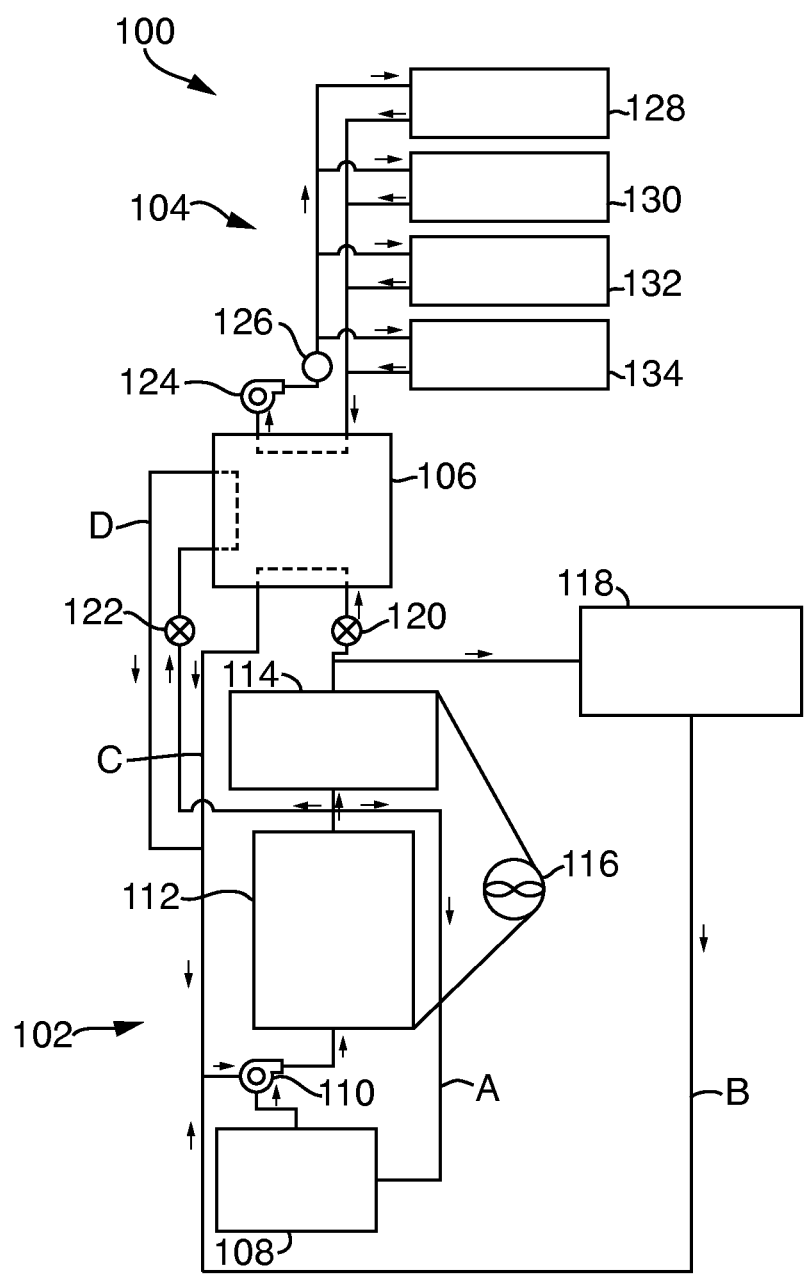
FIG. 1 is a schematic illustration of a cooling system according to an embodiment of the present invention.

Reference will be made below in detail to exemplary embodiments of the invention, examples of which are illustrated in the accompanying drawings. Wherever possible, the same reference numerals used throughout the drawings refer to the same or like parts. Although exemplary embodiments of the present invention are described with respect to rail vehicles and other OHVs, embodiments of the invention are also applicable for use with vehicles, generally. In addition, embodiments of the present invention are equally applicable to any type of machinery, motive or non-motive, that includes an internal combustion engine and any other auxiliary components that require cooling, such as associated power electronics. (As noted above, such vehicles and other machinery are referred to herein as engine-powered units.) For example, the embodiments of the present invention are applicable to underground machinery utilized in the mining industry, having dedicated power electronics, as well as to gensets (e.g., stationary generators), hydraulic fracturing rigs, etc. utilized in the drilling industry. In the exemplary embodiments described below, however, the present invention is described in terms of usage with a vehicle having an internal combustion engine, such as a diesel engine, having a turbocharger or compressor for compressing the combustion air to the engine, with the compressed combustion air being cooled by an intercooler.

With reference to FIG. 1, the present invention provides an integrated cooling system 100 that obviates the need to employ functionally separate cooling systems for the engine and power electronics. As used herein, "power electronics" means the electronics employed for the conversion and control of electric power. As shown in FIG. 1, the cooling system 100 includes an engine cooling loop 102 and a power electronics cooling loop 104 that are thermally interconnected through a liquid-to-liquid heat exchanger 106. As used herein, "thermally interconnected," "thermally connected" and "thermal communication" means that two physical systems or components are associated in such a manner that thermal energy and heat may be transferred between such systems or components.

As shown in FIG. 1, the engine cooling loop 102 includes the engine 108 of the rail vehicle or other engine-powered unit, a pump 110 for circulating a first cooling fluid throughout the engine cooling loop 102, a radiator 112 (e.g., a first liquid-to-air heat exchanger) and a sub-cooler 114 (e.g., a second liquid-to-air heat exchanger) having a cooling fan 116 associated therewith, an intercooler 118 (e.g., a third liquid-to-air heat exchanger), and the liquid-to-liquid heat exchanger 106. In an embodiment, the first cooling fluid is water. In other embodiments, the first cooling fluid may be other types of fluids known in the art, without departing from the broader aspects of the present invention. In an embodiment, the pump 110 may be a centrifugal pump, although other types of pumps known in the art may also be utilized without departing from the broader aspects of the present invention.

In an embodiment, the engine cooling loop 102 includes a number of sub-loops or flow paths therein. For example, a first, or main, sub-loop, A, is defined by the flow of cooling fluid from the engine 108 through the radiator 112 and back to the engine 108. In operation, the pump 110 circulates the cooling fluid through the engine 108 to remove heat generated by the engine cylinders (i.e., heat generated by the engine cylinders is transferred to the cooling fluid). The cooling fluid then passes through the radiator 112, whereby the absorbed heat is dissipated to atmosphere by a flow of air generated by the cooling fan 116. The cooled fluid is then re-circulated through the engine 108 to remove heat generated once again.

A second, or charge-air cooling, sub-loop, B, is defined by the flow of cooling fluid from the engine 108, through the radiator 112, through the sub-cooler 114, through the intercooler 118, and finally back to the engine 108. In operation, the pump 110 circulates the cooling fluid through the engine 108 to transfer excess heat in the engine 108 to the cooling fluid, and then through the radiator 112 to cool the cooling fluid, in the manner described above. Instead of being routed back to the engine 108, however, some of the cooling fluid is directed through the sub-cooler 114 to remove even more heat therefrom. Once the cooling fluid exits the sub-cooler 114, it is passed through the intercooler 118 whereby it cools the compressed combustion air exiting the turbocharger before such air is injected into the engine cylinders where it is used in combustion. After exiting the intercooler 118, the cooling fluid, at a much lower temperature than when it exited the engine 108, is then routed once again through the engine 108 to repeat the heat transfer process.

A third sub-loop, C, is defined by the flow of cooling fluid from the engine 108, through the radiator 112, through the sub-cooler 114, through the liquid-to-liquid heat exchanger 106, and back to the engine 108. In operation, the pump 110 circulates the cooling fluid through the engine 108 to transfer excess heat in the engine 108 to the cooling fluid, through the radiator 112 and the sub-cooler 114, to cool the cooling fluid, in the manner described above. Instead of following the flow path defined by the second sub-loop, B, however, some of the cooled cooling fluid may be selectively routed to, and through, the liquid-to-liquid heat exchanger 106 before being returned to the engine 108. In an embodiment, the flow of cooling fluid from the sub-cooler 114 to the liquid-to-liquid heat exchanger 106 may be regulated through selective actuation of a first control valve 120, as discussed hereinafter. As discussed below, heat may be transferred from the power electronics cooling loop 104 to the cooling fluid of the engine cooling loop 102 within the liquid-to-liquid 106 heat exchanger. In this respect, the engine cooling loop 102 and the power electronics cooling loop 104 are in thermal communication within one another.

As further shown in FIG. 1, a fourth, electronic component heating sub-loop, D, of the engine cooling loop 102 is defined by the flow of cooling fluid from the engine 108, through the radiator 112, as discussed above. Instead of following the flow path of the main sub-loop, A, by being routed back to the engine 108, or the through the sub-cooler 114, a portion of the cooling fluid is routed directly to the liquid-to-liquid heat exchanger 106 by opening a second control valve 122. After passing through the liquid-to-liquid heat exchanger 106, the cooling fluid merges with the flow of cooling fluid from the third cooling loop (after it exits the heat exchanger 106), and is routed back to the engine 108. In an embodiment, the fourth sub-loop, D, may be utilized to heat the power electronics in cold weather operation of the vehicle, as discussed below.

With further reference to FIG. 1, the power electronics cooling loop 104 includes a second pump 124 for circulating a second cooling fluid within the power electronics cooling loop 104, a heater 126, power electronics, e.g., power electronic components 128, 130, 132, and the liquid-to-liquid heat exchanger 106. In an embodiment, the second cooling fluid is water. In other embodiments, the second cooling fluid may be other types of fluids known in the art, without departing from the broader aspects of the present invention. In an embodiment, the pump 110 may be a centrifugal pump, although other types of pumps known in the art may also be utilized without departing from the broader aspects of the present invention.

In operation, second pump 124 circulates the second cooling fluid through the power electronic components 128, 130, 132 to remove heat therefrom. The cooling fluid with heat transferred from the electronic components 128, 130, 132 then passes through the liquid-to-liquid heat exchanger 106. In this manner, heat carried away from the power electronic components 128, 130, 132 is then transferred, through the heat exchanger 106, to the cooling first fluid within the engine cooling loop 102. The cooled, second fluid within the power electronics cooling loop 104 is then re-circulated through the electronic components 128, 130, 132, and the heat transfer cooling process repeats.

As noted above, the engine cooling loop 102 and the power electronics cooling loop 104 are integrated via the heat exchanger 106. As will be readily appreciated, the heat exchanger 106 allows the cooling fluid in each cooling loop 102, 104 to remain physically separate from one other, but allows the respective cooling fluids to be thermally connected so as to provide for the dissipation of heat from the power electronics. Moreover, by integrating the engine cooling loop 102 and the power electronics cooling loop 104, significant savings in terms of weight, volume and cost may be realized. In particular, by integrating the two cooling loops, a dedicated radiator and fan arrangement for cooling the power electronics, which is typical in existing power electronic cooling systems, may be eliminated.

As will be readily appreciated, in extremely cold environments, the power electronic components 128, 130, 132 may lose heat much faster than heat is generated during operation. As power electronics often cannot operate efficiently, or at all, at certain cold temperatures, it becomes necessary to maintain such power electronics at a minimum operating temperature. Existing solutions to this problem have been to use a dedicated fuel-powered heater to heat the power electronics in cold climates. The present invention, however, solves this problem without using any extra fuel, thereby resulting in additional cost savings. In particular, with further reference to FIG. 1, the cooling fluid of the engine cooling loop 102, in addition to carrying away excess heat from the power electronics cooling loop 104, may also be utilized to heat the power electronics in cold environments.

In an embodiment, the third sub-loop, C, may be utilized to provide necessary heat to the power electronic components 128, 130, 132 in cold environments. In particular, valve 120 may be controlled to its open position so that the cooling fluid in the engine cooling loop 102 (exiting the sub-cooler 114), which still carries some heat from the engine 108, enters the heat exchanger 106 whereby the heat carried from the engine is transferred to the lower temperature fluid in the power electronics cooling loop 104. This fluid is then circulated through the power electronic components 128, 130, 132 in order to maintain these components above a minimum operating temperature.

In another embodiment, the fourth sub-loop, D, may be utilized to provide additional heat to the power electronic components 128, 130, 132. In particular, valve 122 may, alternatively, or in addition to valve 120, be controlled to its open position so that the cooling fluid, which has absorbed heat from the engine 108, enters the heat exchanger 106 whereby the absorbed heat carried by the fluid in the engine cooling loop 102 is transferred to the lower temperature fluid of the power electronics cooling loop 104. The heat absorbed by the fluid in the power electronics cooling loop 104 can then be carried and transferred to the power electronic components 128, 130, 132 in order to maintain these components at an optimum operating temperature. As will be readily appreciated, the fluid in the fourth sub-loop, D, is at a higher temperature than the fluid in the third sub-loop, C, as the fluid in the third sub-loop, C, passes through the sub-cooler 114 prior to entering the heat exchanger 106. As such, the third sub-loop, C, may be utilized when only a slight increase in the temperature of the power electronic components 128, 130, 132 is desired, with the fourth sub-loop, D, being utilized when a more drastic increase in temperature is needed.

In an embodiment, the valves 120, 122 may be temperature controlled valves that are configured to open (e.g., that are controlled to open) when the temperature(s) of the power electronic components 128, 130, 132 fall below a predetermined threshold or thresholds. In this respect, one or more temperature sensors (not shown) associated with the power electronic components may be configured to monitor the temperature of the power electronics and relay a signal representing such temperature to a control unit, such as a microprocessor (not shown). The control unit may be configured to control the valves 120, 122 to their respective open and closed positions in dependence upon the sensed temperature.

Moreover, in extremely cold environments where the heat transferred from the fluid of the engine cooling loop 102 to the fluid of the power electronics cooling loop 104 is not sufficient to maintain the power electronic components 128, 130, 132 at a minimum operating temperature, the power electronics cooling loop 104 may also include a heater 126, such as a line heater or the like, which can be selectively activated to supplement the heat provided by the fluid of the engine cooling loop 102 (i.e., the heat from the third and fourth sub-loops, C, D). In particular, heater 126 may be selectively activated to further warm the fluid in the power electronics cooling loop 104 to maintain the temperature of the power electronic components 128, 130, 132 within a desired operating range.

As will be readily appreciated, the physical isolation of the cooling fluids within the engine cooling loop 102 and the power electronics cooling loop 104, while allowing for thermal communication (i.e., heat transfer) therebetween, facilitates heating and cooling of the power electronic components, as needed. In addition, the ability to actively control the passage of cooling fluid in the third and fourth sub-loops to the heat exchanger 106 via the opening and closing of valves 120, 122, and the inclusion of heater 126 in the power electronics cooling loop 104, provides for even more precise control of the heating and cooling of the power electronic components 128, 130, 132. Such active control facilitates maintenance of the temperature of power electronics within preferred operating ranges, thereby minimizing thermal cycling and increasing life span. Indeed, this active temperature control may be optimized to maximize the life span of power electronics.

In an embodiment, as shown in FIG. 1, the power electronics cooling loop 104 may also include a thermal management unit 134. Heat dissipated from the power electronic components 128, 130, 132 may be transferred to the thermal management unit 134, which can then be utilized to heat and maintain engine oil temperatures in extreme cold climates. Moreover, the thermal management unit 134 may be utilized to heat engine liquids, e.g., fuel, oil, water, etc., as necessary, which provides for savings in terms of fuel and engine wear, especially when operating in cold conditions.

In an embodiment, the integrated cooling system 100 may further include a dedicated liquid-to-air heat exchanger (not shown) within the power electronics cooling loop 104 to provide increased cooling performance.

While FIG. 1 illustrates the integrated cooling system 100 with the power electronics cooling loop 104 being fluidly isolated from (but thermally integrated with) the engine cooling loop 102, in an embodiment, the liquid-to-liquid heat exchanger 106 may be omitted from the system. As will be readily appreciated, in such an embodiment, the power electronics cooling loop and the engine cooling loop would be fluidly connected, i.e., they would no longer be isolated by the heat exchanger 106. In particular, in this embodiment, the first fluid is a fluid portion flowing through one loop (e.g., the engine cooling loop 102), and the second fluid is a fluid portion flowing through the other loop (e.g., the power electronics cooling loop 104), and heat is exchanged between the two by the fluids intermingling.

Figure 2:
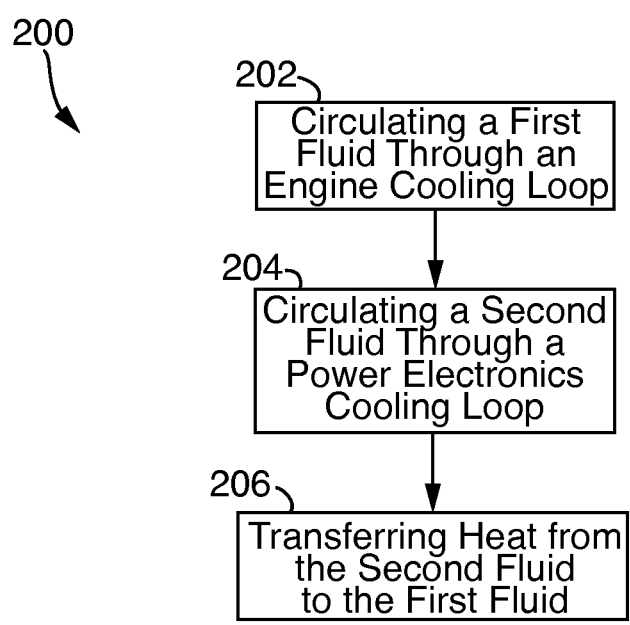
FIG. 2 is a flow diagram illustrating a method for cooling an engine and power electronics of an engine-powered unit according to an embodiment of the present invention.

With reference to FIG. 2, a method 200 for cooling an engine and power electronics of an engine-powered unit is illustrated. As shown at step 200, a first fluid is circulated through an engine cooling loop of the engine-powered unit. At step 204, a second fluid Is circulated through a power electronics cooling loop of the engine-powered unit. Then, at step 206, heat is transferred, in the manner discussed above, from the second fluid to the first fluid. As will be readily appreciated, transferring heat from the second fluid to the first fluid effectively cools the second fluid.

An embodiment of the present invention relates to a cooling system for a vehicle or other engine-powered unit. The system includes an engine cooling loop having a first fluid configured for circulation through an engine of the engine-powered unit and a power electronics cooling loop having a second fluid configured for circulation through at least one power electronics component of the engine-powered unit. The engine cooling loop is fluidly isolated from, and in thermal communication with, the power electronics cooling loop.

In an embodiment, the engine cooling loop includes a radiator and cooling fan configured to dissipate heat from the first fluid.

In an embodiment, the engine cooling loop may include an intercooler configured to cool compressed combustion air from a turbocharger associated with the engine of the vehicle or other engine-powered unit.

In an embodiment, the engine cooling loop and the power electronics cooling loop are in thermal communication with one another via a heat exchanger. In an embodiment, the heat exchanger may be a liquid-to-liquid heat exchanger, whereby heat is transferred from one of the first fluid and the second fluid to the other of the first fluid and the second fluid.

In an embodiment, the system may include a first valve in the engine cooling loop between the radiator and the heat exchanger. The valve may be configured to control a flow of the first fluid from the engine to the heat exchanger after passing through the radiator.

In yet another embodiment, the system may include a second valve in the engine cooling loop, the second valve being configured to control a flow of the first fluid from the engine directly to the heat exchanger.

In another embodiment of the system, the engine cooling loop includes a sub-cooler.

In an embodiment, the system also includes a first pump configured to circulate the first fluid throughout the engine cooling loop and a second pump configured to circulate the second fluid throughout the power electronics cooling loop.

In another embodiment, an auxiliary heater configured to heat the second fluid in the power electronics loop may be provided.

In another embodiment, a method for cooling an engine and power electronics of a engine-powered unit is provided. The method includes the steps of circulating a first fluid through an engine cooling loop to remove heat from the engine, circulating a second fluid through a power electronics cooling loop to remove heat from the power electronics, and cooling the second fluid by transferring heat from the second fluid to the first fluid.

In an embodiment, the step of cooling the second fluid includes passing the first fluid and the second fluid through a liquid-to-liquid heat exchanger.

In an embodiment, the engine cooling loop and the power electronics cooling loop are fluidly isolated from one another.

In another embodiment, the engine cooling loop and the power electronics cooling loop are in fluid communication with one another.

In an embodiment, the method may further include the step of utilizing heat dissipated from the power electronics to heat engine liquids including at least one of fuel, oil and water.

In another embodiment, the method may include the steps of sensing a temperature of one of a component of the power electronics and the second fluid, and activating an auxiliary heater to heat the second fluid when the temperature of the component or the second fluid drops below a predetermined lower threshold.

In yet another embodiment, the method may include the steps of, when a temperature of a component of the power electronics reaches a predetermined lower threshold, controlling a flow of the first fluid directly from the engine to the liquid-to-liquid heat exchanger, and transferring heat from the first fluid to the second fluid.

In another embodiment, the method may further include the step of controlling the temperature of the second fluid in the power electronics cooling loop by selectively controlling the flow of the first fluid to the heat exchanger through one or more control valves.

In another embodiment, a cooling system is provided. The cooling system includes a first loop having a first fluid configured for circulation through a first component, a second loop having a second fluid configured for circulation through a second component, and a heat exchanger configured to transfer of heat from one of the first fluid and the second fluid to the other of the first fluid and the second fluid. The first fluid and the second fluid are fluidly isolated from one another.

In an embodiment, the first component is an engine of a vehicle, and the second component is a power electronics component of the vehicle.

In yet another embodiment, a cooling system is provided. The cooling system includes an engine having a plurality of first cooling passages, at least one power electronics component having a plurality of second cooling passages, a heat exchanger in fluid communication with the engine and the at least one power electronics component, and a pump configured to circulate a cooling fluid through the engine, the at least one power electronics component and the heat exchanger to remove heat from the engine and the at least one power electronics component.

In an embodiment, the heat exchanger is positioned along a fluid flow path between the engine and the at least one power electronics component.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the cooling system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A cooling system for an engine-powered unit, comprising:
    an engine cooling loop having a first fluid configured for circulation through an engine and a radiator of the engine-powered unit;
    a power electronics cooling loop having a second fluid configured for circulation through at least one power electronics component of the engine-powered unit;
    a heat exchanger providing thermal communication between the engine cooling loop and the power electronics cooling loop; and
    a first valve in the engine cooling loop between the radiator and the heat exchanger, the first valve being configured to selectively control a flow of the first fluid from the engine to the heat exchanger after passing through the radiator when the first valve is in an open position, or from the engine, through the radiator and back to the engine without passing through the heat exchanger when the first valve is in a closed position;
    wherein the engine cooling loop is fluidly isolated from the power electronics cooling loop;
    wherein the at least one power electronics component is configured to convert and control electric power in the engine-powered unit;
    wherein the power electronics cooling loop does not include a radiator or a fan; and
    wherein the first valve is configured to be automatically controlled to the open position when a sensed temperature of the at least one power electronics component falls below a threshold temperature to permit the first fluid to flow through the heat exchanger immediately after passing through the radiator to transfer heat from the engine to the power electronics cooling loop in order to increase the temperature of the at least one power electronics component.

2. The cooling system of claim 1, further comprising:
a first pump configured to circulate the first fluid throughout the engine cooling loop; and
a second pump configured to circulate the second fluid throughout the power electronics cooling loop.

3. The cooling system of claim 1, further comprising:
an auxiliary heater configured to heat the second fluid in the power electronics loop.

4. The cooling system of claim 1, wherein:
the heat exchanger is a liquid-to-liquid heat exchanger, through which heat is transferred from one of the first fluid and the second fluid to the other of the first fluid and the second fluid.

5. The system of claim 1, wherein:
the at least one power electronics component is configured to control a conversion of mechanical energy in the engine-powered unit into the electric power.

6. The system of claim 5, wherein:
the engine cooling loop includes a second sub-loop, the second sub-loop including the engine, the radiator, a subcooler, a second valve, and the heat exchanger for providing the thermal communication and fluid isolation between the engine cooling loop and the power electronics cooling loop;
wherein the second valve is selectively actuatable to permit the first fluid to flow through the second sub-loop from the engine, through the radiator, through the subcooler, and then through the heat exchanger after passing through the subcooler to transfer heat to the power electronics cooling loop through the heat exchanger.

7. The system of claim 6, wherein:
the engine cooling loop includes a first sub-loop, the first sub-loop including the engine, the radiator, the first valve, and the heat exchanger.

8. The system of claim 1, wherein:
the at least one power electronics component is configured to control supply of the electric power to traction motors of the engine-powered unit.

9. The system of claim 8, wherein:
the engine cooling loop includes a second sub-loop, the second sub-loop including the engine, the radiator, a subcooler, a second valve, and the heat exchanger for providing the thermal communication and fluid isolation between the engine cooling loop and the power electronics cooling loop;
wherein the second valve is selectively actuatable to permit the first fluid to flow through the second sub-loop from the engine, through the radiator, through the subcooler, and then through the heat exchanger after passing through the subcooler to transfer heat to the power electronics cooling loop through the heat exchanger.

10. The system of claim 9, wherein:
the engine cooling loop includes a first sub-loop, the first sub-loop including the engine, the radiator, the first valve, and the heat exchanger.

11. The system of claim 1, wherein:
the engine cooling loop includes a second sub-loop, the second sub-loop including the engine, the radiator, a subcooler, a second valve, and the heat exchanger for providing the thermal communication and fluid isolation between the engine cooling loop and the power electronics cooling loop;

wherein the second valve is selectively actuatable to permit the first fluid to flow through the first sub-loop from the engine, through the radiator, through the subcooler, and then through the heat exchanger after passing through the subcooler to transfer heat to the power electronics cooling loop through the heat exchanger.

12. A cooling system for an engine-powered unit, comprising:

an engine cooling loop having a first fluid configured for circulation through an engine of the engine-powered unit; and a power electronics cooling loop having a second fluid configured for circulation through at least one power electronics component of the engine-powered unit;

wherein the engine cooling loop is fluidly isolated from, and in thermal communication with, the power electronics cooling loop via a heat exchanger;

wherein the engine cooling loop includes a first sub-loop, the first sub-loop including the engine, the radiator, a subcooler, a first valve, and the heat exchanger;

wherein the engine cooling loop includes a second sub-loop, the second sub-loop including the engine, the radiator, a second valve, and the heat exchanger;

wherein the first valve and the second valve are configured to open and close in dependence upon a sensed temperature of the at least power electronics component;

wherein the first valve is controllable to open when the temperature of the at least one power electronics component falls below a first threshold temperature to permit the first fluid to flow through the first sub-loop from the engine, through the radiator, through the subcooler, and then through the heat exchanger at a first temperature after passing through the subcooler to transfer heat from the engine to the power electronics cooling loop through the heat exchanger to increase a temperature of the at least one power electronics component to a first extent;

wherein the second valve is controllable to open when the temperature of the at least one power electronics component falls below a second threshold temperature to permit the first fluid to flow through the second sub-loop from the engine, through the radiator, and then through the heat exchanger at a second temperature after passing through the radiator to transfer heat from the engine to the power electronics cooling loop through the heat exchanger to increase the temperature of the at least one power electronics component to a second extent, the second temperature being greater than the first temperature and the second extent being greater than the first extent;

wherein there is no radiator or fan in the power electronics cooling loop; and wherein the first valve or the second valve is actuated in dependence upon an extent of the temperature increase desired for the at least one power electronics component.

13. A cooling system for an engine-powered unit, comprising:

an engine cooling loop having a first fluid configured for circulation through an engine of the engine-powered unit; and a power electronics cooling loop having a second fluid configured for circulation through at least one power electronics component of the engine-powered unit;

wherein the engine cooling loop is fluidly isolated from, and in thermal communication with, the power electronics cooling loop;

wherein the engine cooling loop includes a first sub-loop, the first sub-loop including the engine, a radiator, a subcooler, a first valve, and a heat exchanger for providing the thermal communication and fluid isolation between the engine cooling loop and the power electronics cooling loop;

wherein the first valve is controllable to open when a sensed temperature of the at least one power electronics component falls below a first threshold temperature to permit the first fluid to flow through the first sub-loop, from the engine, through the radiator, through the subcooler, and then through the heat exchanger at a first temperature after passing through the subcooler to transfer heat to the power electronics cooling loop through the heat exchanger to raise the temperature of the at least one power electronics component a first amount;

wherein the engine cooling loop includes a second sub-loop, the second sub-loop including the engine, the radiator, a second valve, and the heat exchanger;

wherein the second valve is controllable to open when the sensed temperature of the at least one power electronics component falls below a second threshold temperature to permit the first fluid to flow through the second sub-loop, from the engine, through the radiator, and then through the heat exchanger at a second temperature after passing through the radiator to transfer heat to the power electronics cooling loop through the heat exchanger to raise the temperature of the at least one power electronics component a second amount that is greater than the first amount, the second temperature being greater than the first temperature;

wherein the first valve or the second valve is actuated in dependence upon an extent of temperature increase desired for the at least one power electronics component; and wherein there is no radiator or fan in the power electronics cooling loop.

14. The system of claim 13, further comprising:

a thermal management unit in the power electronics cooling loop for receiving heat from the at least one power electronics component for use in maintaining engine oil temperatures in cold conditions.

* * * * *